(12) United States Patent
Kim et al.

(10) Patent No.: US 8,157,034 B2
(45) Date of Patent: Apr. 17, 2012

(54) VEHICLE ASSEMBLY WITH INDEPENDENT ELECTRIC WHEEL MOTORS FOR ELECTRIC HYBRID VEHICLES

(76) Inventors: Calvin Kim, Cerritos, CA (US); Jim Hall, Newport Beach, CA (US)

(*) Notice: Subject to any disclaimer, the term of this patent is extended or adjusted under 35 U.S.C. 154(b) by 0 days.

(21) Appl. No.: 13/163,628

(22) Filed: Jun. 17, 2011

(65) Prior Publication Data

US 2011/0251018 A1 Oct. 13, 2011

Related U.S. Application Data

(63) Continuation of application No. 12/140,141, filed on Jun. 16, 2008, now Pat. No. 7,984,777.

(51) Int. Cl.
*B60K 6/02* (2006.01)

(52) U.S. Cl. ............. 180/65.21; 180/65.6; 180/197; 180/247

(58) Field of Classification Search ......... 180/65.21, 180/197, 247, 68.1, 65.51; 301/137
See application file for complete search history.

(56) References Cited

U.S. PATENT DOCUMENTS

| | | | | |
|---|---|---|---|---|
| 5,099,654 A * | 3/1992 | Baruschke et al. | ............ | 62/180 |
| 5,562,178 A * | 10/1996 | Worden et al. | ............ | 180/291 |
| 6,105,696 A * | 8/2000 | Chen | ............ | 180/65.1 |
| 6,488,108 B1 * | 12/2002 | Boll | ............ | 180/65.25 |
| 6,837,322 B2 * | 1/2005 | Jurado et al. | ............ | 180/65.245 |
| 7,314,105 B2 * | 1/2008 | Varela | ............ | 180/65.6 |
| 7,464,779 B2 * | 12/2008 | Grabmaier et al. | ......... | 180/65.1 |
| 7,497,288 B2 * | 3/2009 | Tsukada et al. | ............ | 180/68.1 |
| 7,503,871 B2 * | 3/2009 | Kozarekar et al. | ............ | 477/3 |
| 7,658,891 B1 * | 2/2010 | Barnes | ............ | 422/186.03 |
| 7,690,457 B2 * | 4/2010 | Nakanowatari | ......... | 180/65.265 |
| 7,694,773 B2 * | 4/2010 | Janson et al. | ............ | 180/243 |
| 2008/0245595 A1 * | 10/2008 | Janson et al. | ............ | 180/243 |

* cited by examiner

*Primary Examiner* — J. Allen Shriver, II
*Assistant Examiner* — James Triggs
(74) *Attorney, Agent, or Firm* — Lee, Hong, Degerman, Kang & Waimey (57) ABSTRACT

A vehicle drive assembly is provided. The vehicle drive assembly includes an engine, a transmission operably coupled with the engine, an output shaft operably coupled with the transmission, a differential operably coupled with the output shaft, an axle shaft rotatably coupled to the differential, at least one wheel selectively coupled to the axle shaft via a rotatable axle stub, an electric wheel motor operably coupled to the at least one wheel via the rotatable axle stub, and a coupling device operably coupled with the electric wheel motor for selectively coupling the axle stub with the axle shaft.

20 Claims, 5 Drawing Sheets

VEHICLE ASSEMBLY WITH INDEPENDENT ELECTRIC WHEEL MOTORS FOR ELECTRIC HYBRID VEHICLES

This application is a continuation of U.S. application Ser. No. 12/140,141, filed Jun. 16, 2008 now U.S. Pat. No. 7,984,777, the contents of which are hereby incorporated by reference herein in its entirety.

BACKGROUND OF THE INVENTION

1. Field of the Invention

The invention generally relates to drive systems for vehicles, and more particularly, to a drive system having electric wheel motors mounted to each wheel of the vehicle.

2. Discussion of the Related Art

Generally, vehicles may be powered by an internal combustion engine or one or more electric motors. Some so-called hybrid vehicles include a combination of an internal combustion engine and electric motor power. Such hybrid vehicles sometimes include parallel drive systems that provide propulsion modes from the electric motor, internal combustion engine, or both.

Typically, the mechanical coupling that allows selection between electrical or internal combustion power is mounted directly to the internal combustion engine, vehicle transmission, or a so-called summation gearbox that combines the electric drive with the mechanical drive. Such arrangements allow for a controller or the vehicle operator to select between the electrical power and the internal combustion power for driving the vehicle.

A major drawback of previous vehicles that combine the electric drive with the mechanical drive is that there is little modularity in design. The electric motor or drive may be bulky and large. Additionally, the transmission required to operate both the electric motor and internal combustion engine is complex in design.

The present invention provides an arrangement that allows for a decentralized or modular design where an electric wheel motor is mounted at each wheel. This allows for improved modularity, smaller parts, improved safety, and reduced maintenance costs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a vehicle drive assembly is provided. The vehicle drive assembly includes an engine, a transmission operably coupled with the engine, an output shaft operably coupled with the transmission, wherein the output shaft rotates according to an operation between the engine and the transmission, a differential operably coupled with the output shaft, an axle shaft rotatably coupled to the differential, wherein the axle shaft is rotated by the differential when the output shaft rotates, at least one wheel selectively coupled to the axle shaft via a rotatable axle stub wherein the at least one wheel is rotated according to a rotation of the axle shaft when the axle shaft is operably coupled to the axle stub, an electric wheel motor operably coupled to the at least one wheel via the rotatable axle stub, wherein the at least one wheel is rotated when the electric wheel motor provides a torque to the rotatable axle stub, and a coupling device operably coupled with the electric wheel motor for selectively coupling the axle stub with the axle shaft, wherein when the axle shaft is not coupled to the axle stub, the at least one wheel cannot be rotated by the engine via the axle shaft.

In one feature, the vehicle drive assembly further includes a power storage medium providing power to the electric wheel motor.

In another feature, the vehicle drive assembly further includes a controller for controlling the vehicle drive assembly according to at least one of a first mode wherein the coupling device uncouples the axle shaft from the axle stub and the electric wheel motor alone provides torque to the axle stub to rotate the at least one wheel, a second mode wherein the engine alone provides torque to the axle stub via the axle shaft to rotate the at least one wheel, and a third mode wherein both the electric wheel motor and engine provide torque to the axle stub to rotate the at least one wheel. Furthermore, the controller controls the operation of the engine in a fourth mode such that the engine functions as a generator for a power storage medium providing power to the electric wheel motor. Moreover, the controller controls the vehicle drive assembly according to the first mode when a vehicle speed is less than a predetermined speed. Additionally, the controller controls the vehicle drive assembly according to the second mode and third mode when a vehicle speed is greater than a predetermined speed.

In yet another feature, the controller controls the amount of torque output from the electric wheel motor. Furthermore, the amount of torque output from the electric wheel motor varies according to at least one of a driver selection, a road condition, and a driving condition.

In still yet another feature, the electric wheel motor supplies a force to the axle stub to reduce the rotation of the at least one wheel in the first mode, second mode, or third mode. Additionally, the electric wheel motor further includes a planetary gearset for operation in the third mode.

In one embodiment, a vehicle drive assembly is provided. The vehicle drive assembly includes an engine, a transmission operably coupled with the engine a transfer unit operably associated with the transmission, a rear output shaft operably coupled with the transfer unit, wherein the rear output shaft rotates according to an operation between the engine, the transmission, and the transfer unit, a front output shaft operably coupled with the transfer unit, wherein the front output shaft rotates according to an operation between the engine, the transmission, and the transfer unit, a front differential operably coupled with the front output shaft, a rear differential operably coupled with the rear output shaft, a front axle shaft rotatably coupled to the front differential, wherein the front axle shaft is rotated by the front differential when the front output shaft rotates, a rear axle shaft rotatably coupled to the rear differential, wherein the rear axle shaft is rotated by the rear differential when the rear output shaft rotates, at least one front wheel selectively coupled to the front axle shaft via a front rotatable axle stub wherein the at least one front wheel is rotated according to a rotation of the front axle shaft when the front axle shaft is operably coupled to the front axle stub, at least one rear wheel selectively coupled to the rear axle shaft via a rear rotatable axle stub wherein the at least one rear wheel is rotated according to a rotation of the rear axle shaft when the rear axle shaft is operably coupled to the rear axle stub, an electric wheel motor operably coupled to the at least one front wheel via the front rotatable axle stub, wherein the at least one front wheel is rotated when the electric wheel motor provides a torque to the front rotatable axle stub, and a coupling device operably coupled with the electric wheel motor for selectively coupling the front axle stub with the front axle shaft, wherein when the front axle shaft is not coupled to the front axle stub, the at least one front wheel cannot be rotated by the engine via the front axle shaft.

In another embodiment, a vehicle drive assembly is provided. The vehicle drive assembly includes an engine, a transmission operably coupled with the engine, a transfer unit operably associated with the transmission, a rear output shaft operably coupled with the transfer unit, wherein the rear output shaft rotates according to an operation between the engine, the transmission, and the transfer unit, a front output shaft operably coupled with the transfer unit, wherein the front output shaft rotates according to an operation between the engine, the transmission, and the transfer unit, a front differential operably coupled with the front output shaft, a rear differential operably coupled with the rear output shaft, a front axle shaft rotatably coupled to the front differential, wherein the front axle shaft is rotated by the front differential when the front output shaft rotates, a rear axle shaft rotatably coupled to the rear differential, wherein the rear axle shaft is rotated by the rear differential when the rear output shaft rotates, at least one front wheel selectively coupled to the front axle shaft via a front rotatable axle stub wherein the at least one front wheel is rotated according to a rotation of the front axle shaft when the front axle shaft is operably coupled to the front axle stub, at least one rear wheel selectively coupled to the rear axle shaft via a rear rotatable axle stub wherein the at least one rear wheel is rotated according to a rotation of the rear axle shaft when the rear axle shaft is operably coupled to the rear axle stub, an electric wheel motor operably coupled to the at least one rear wheel via the rear rotatable axle stub, wherein the at least one rear wheel is rotated when the electric wheel motor provides a torque to the rear rotatable axle stub, and a coupling device operably coupled with the electric wheel motor for selectively coupling the rear axle stub with the rear axle shaft, wherein when the rear axle shaft is not coupled to the rear axle stub, the at least one rear wheel cannot be rotated by the engine via the rear axle shaft.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
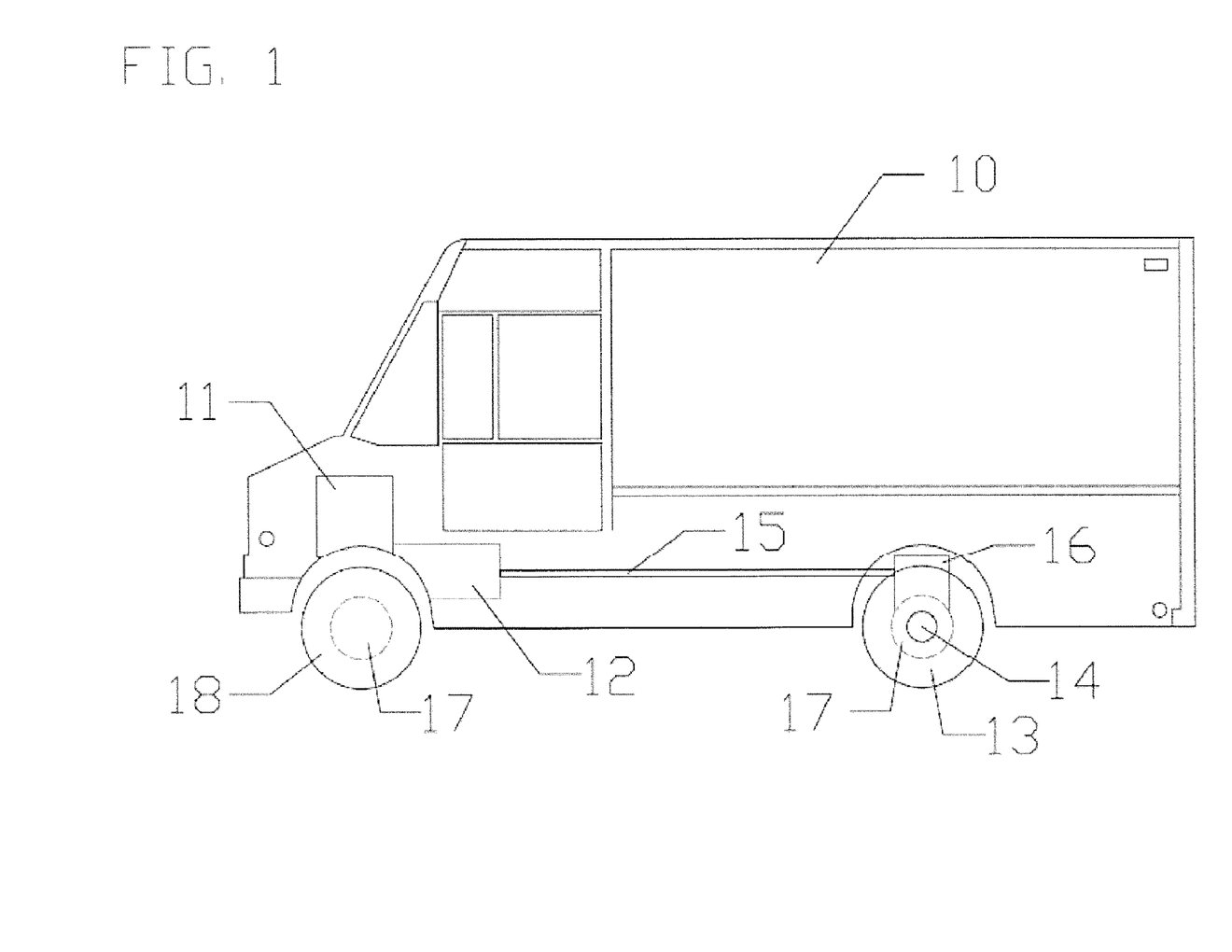
FIG. 1 illustrates a vehicle incorporating a vehicle drive system in accordance with one embodiment of the present invention.

FIG. 1 illustrates an example of a vehicle 10 with which electric wheel motors 17 may be used in accordance with embodiments of the present invention. In one embodiment, an internal combustion engine 11 provides a driving torque to wheels 13 through a conventional transmission system 12 which is associated with an output shaft 15 and a differential 16. The wheels 13 are supported by a coaxial axle shaft 14 which is coupled to the differential 16. The wheels 13 are also coupled with an electric wheel motor 17.

Figure 2:
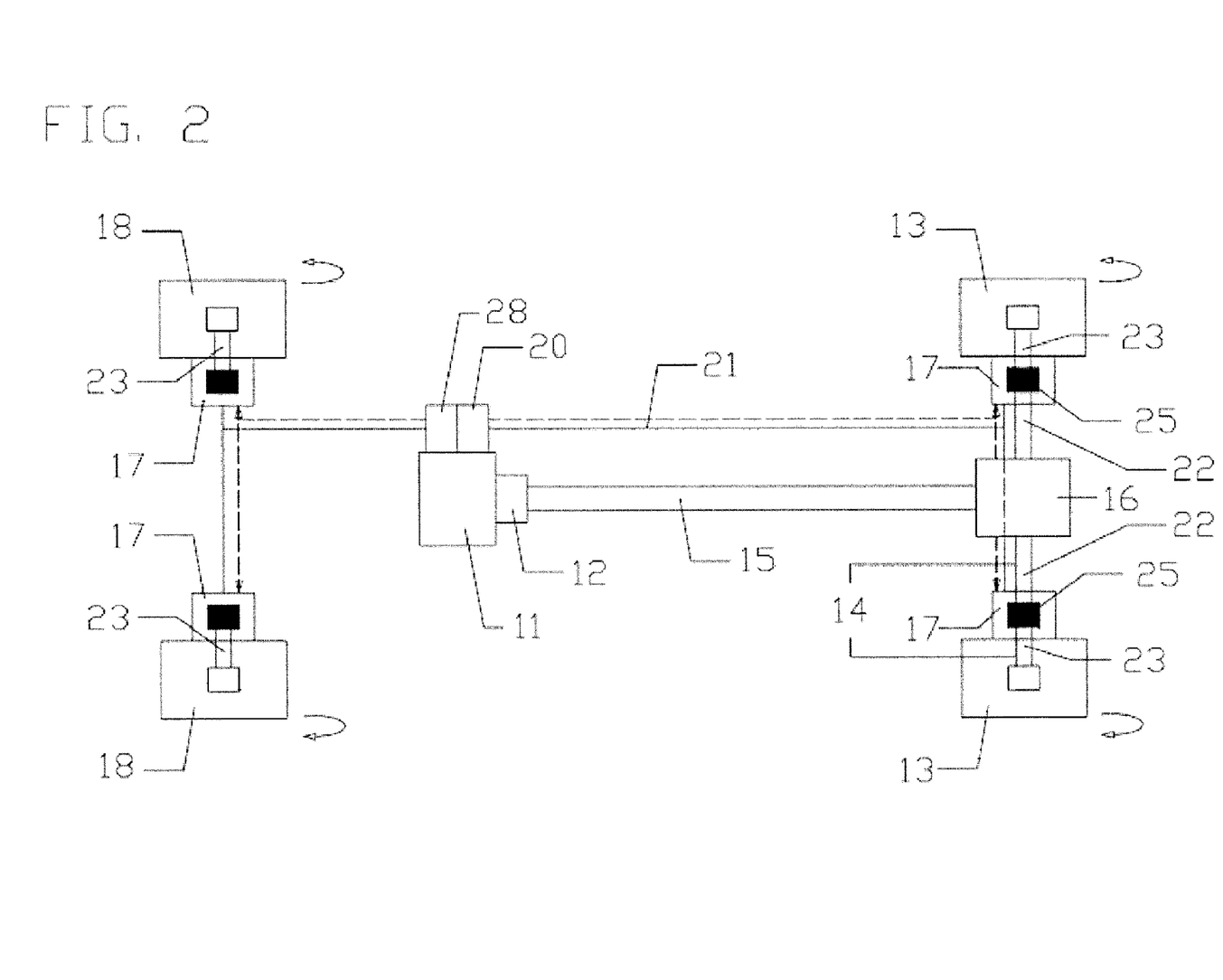
FIG. 2 illustrates a first mode of operation of the vehicle drive system in accordance with one embodiment of the present invention.
Figure 3:
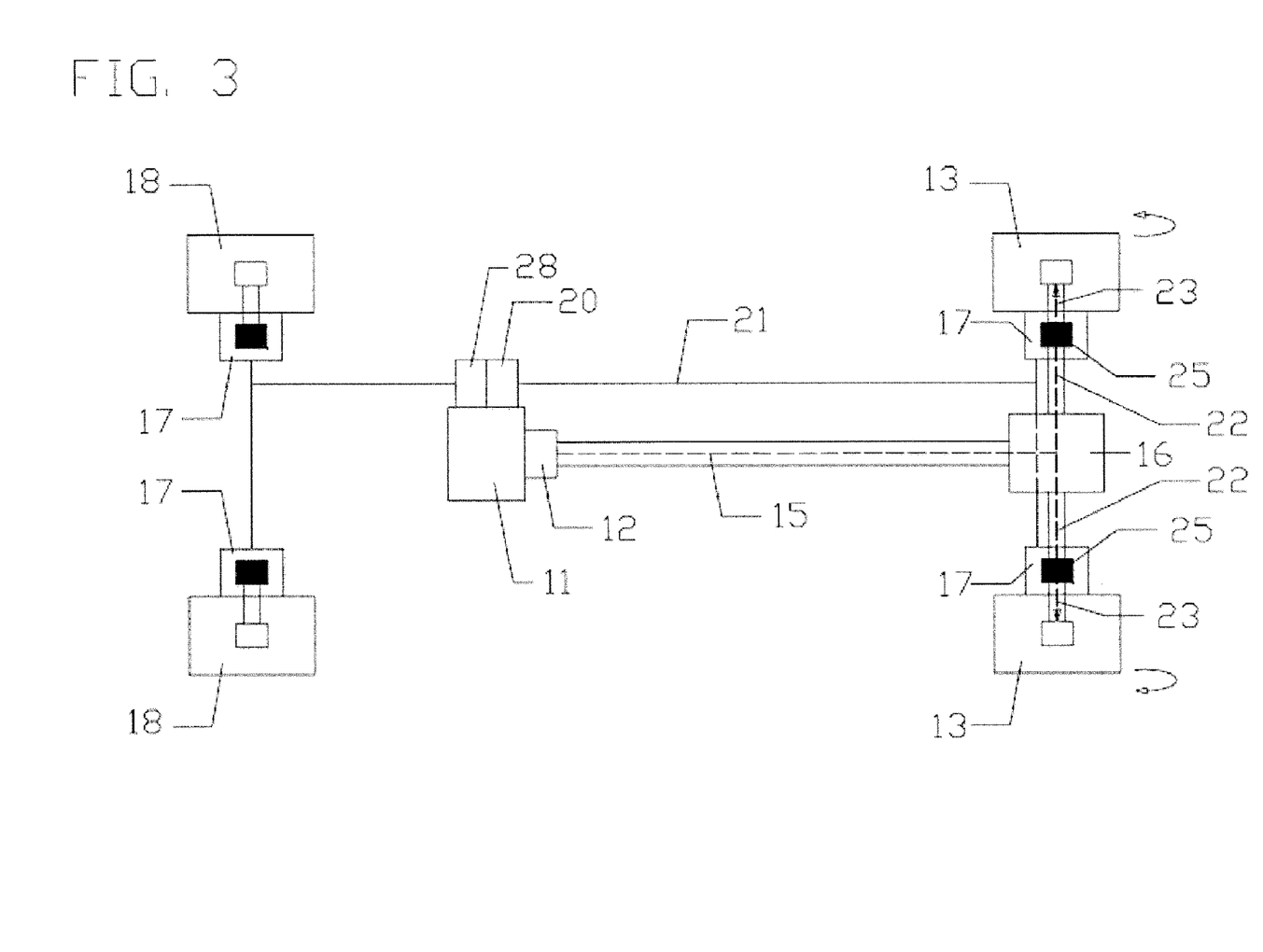
FIG. 3 illustrates a second mode of operation of the vehicle drive system in accordance with one embodiment of the present invention.
Figure 4:
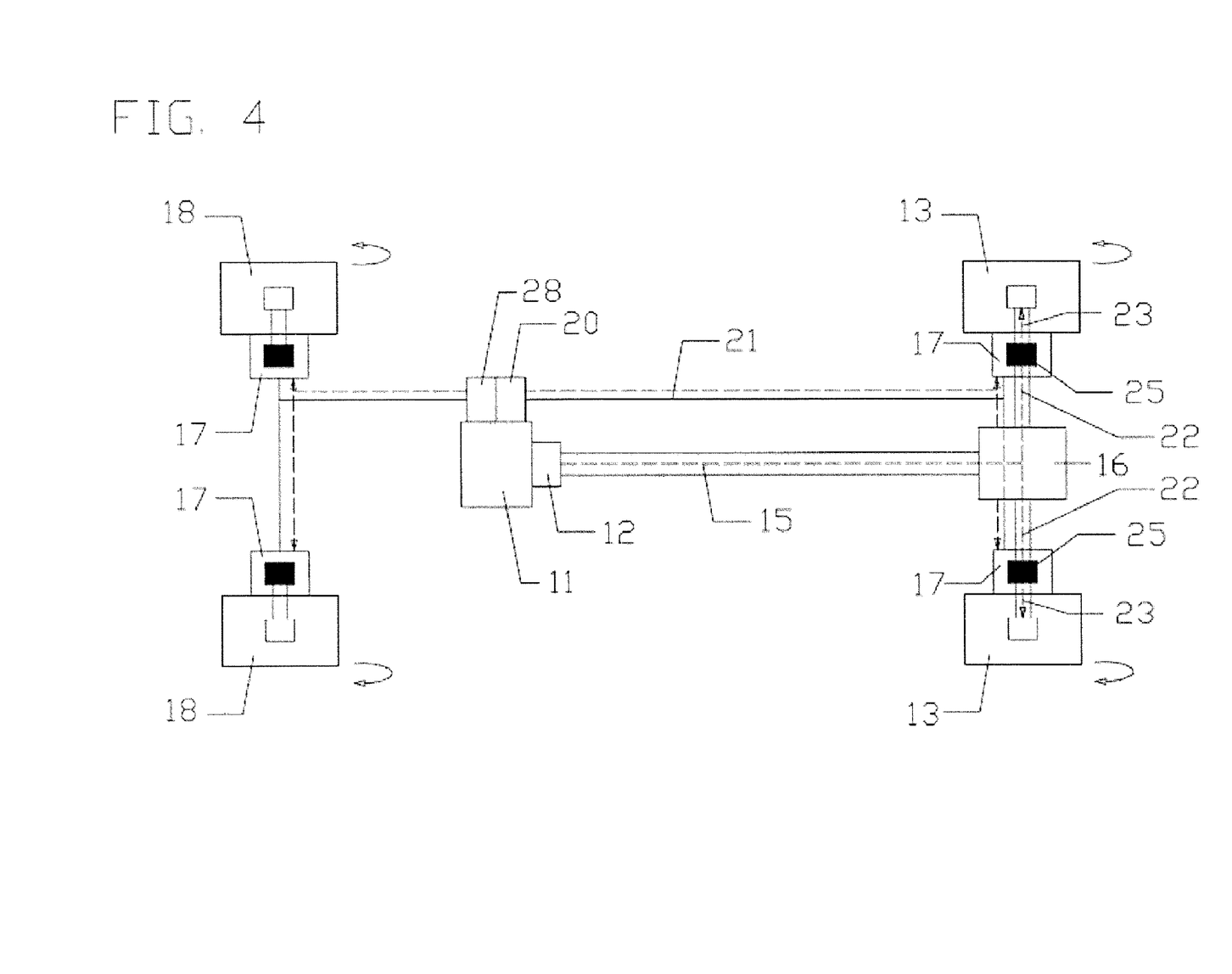
FIG. 4 illustrates a third mode of operation of the vehicle drive system in accordance with one embodiment of the present invention.

FIGS. 2-4 are perspective diagrams of a vehicle drive assembly with an electric wheel motor 17 coupled with wheels 13, 18. As shown in FIG. 2-4, the vehicle drive assembly includes an internal combustion engine 11 with a conventional transmission system 12. The internal combustion engine 11 may provide driving torque to the wheels 13 via output shaft 15 which is coupled to the transmission 12. The output shaft 15 provides torque to the axle shaft 22 via the differential 16. The axle shaft 22 may be selectively coupled to the axle stub 23 via a clutch unit 25 which is housed in the electric wheel motor 17. The coupled axle shaft 22 and axle stub 23 comprise the coaxial shaft 14. The differential 16 may be a conventional differential for providing the desired torque distribution to the wheels 13. The output shaft 15 may provide driving torque to wheels 13 depending on the operative condition of the clutch unit 25, which selectively couples the axle shaft 22 to the axle stub 23.

The vehicle drive assembly also includes electric wheel motors 17 respectively coupled with wheels 13, 18. In this example the vehicle assembly includes four wheels, however, alternate embodiments of the present invention may include more than four wheels, wherein each wheel may be coupled to an electric wheel motor. Each electric wheel motor 17 may provide torque to the respectively coupled wheel via an axle stub 23 coupled between each wheel 13, 18 and electric wheel motor 17. A controller 20 controls operation of each electric wheel motor 17. The controller 20 is connected to each electric wheel motor 17 via a control line 21. A power storage unit 28 provides the electricity to power each electric wheel motor 17. In this example, the power storage unit 28 may connect with each electric wheel motor 17 via the control line 21. In an alternate embodiment, the power storage unit 28 may connect with each electric wheel motor 17 via a power line that is separate from the control line 21. The power storage unit 28 may be capable of short-term and high-load storage of electricity.

FIG. 2 shows the operation of selected components of a vehicle drive system in a first operating mode where torque distribution is performed by the electric wheel motors 17 in accordance with one embodiment of the present invention. Under certain conditions it may be desirable to provide torque for rotating the wheels 13, 18 exclusively from the electric wheel motors 17. For example, it may be preferable for the electric wheel motors 17 to exclusively provide torque for rotating the wheels 13, 18 when the vehicle is operated at a speed less than a predetermined speed. The predetermined speed may be set by a manufacturer or a user. Additionally, the predetermined speed may be set according to driving conditions, driving habits, road conditions, or a combination thereof.

As shown in FIG. 2, the power storage unit 28 provides power to each electric wheel motor 17 via the control unit line 21. When the electric wheel motors 17 have received power from the power storage unit 28, the control unit 20 controls the operation of each electric wheel motor 17.

Each electric wheel motor 17 is coupled to an axle stub 23 which is coupled to each wheel 13, 18. The control unit 20 controls each electric wheel motor 17 to provide torque to the axle stub 23 which then rotates each wheel 13, 18. The control unit 20 may vary the amount of torque applied to each wheel 13, 18 via the electric wheel motor 17. Preferably, the control unit 20 may vary the amount of torque applied to each wheel 13, 18 according to at least one of a user selection, a driving condition, a road condition, and a user's driving habits. Additionally, the amount of torque applied to each wheel may be varied to provide the vehicle with various performance functions such as launch control, traction control, stability control, or an anti-lock brake system.

In addition to varying the amount of torque applied to each wheel 13, 18, the control unit 20 may control each electric wheel motor to reduce or stop the rotation of each respective wheel 13, 18. The control unit 20 may control each electric wheel motor 17 to act as a traditional brake such that the vehicle 10 using the vehicle drive system of the present invention may bypass or eliminate the use of a traditional braking mechanism.

In an alternate embodiment of the present invention, each electric wheel motor 17 may house a planetary transmission (not shown) for providing the necessary gear reduction between the electric wheel motor 17 and the axle stub 23. The gear reduction provided by the planetary transmission provides desired rotation and torque to the axle stub 23 and allows the electric wheel motor to operate at an optimal round per minute (RPM) range. The planetary transmission may be controlled by the control unit 20 when the vehicle is in the first operating mode.

In accordance with the present invention, while the vehicle operates in the first operating mode, i.e. when the vehicle is operated at a speed less than the predetermined speed, the control unit 20 controls a clutch unit 25 to un-couple the axle shaft 22 from the axle stub 23. When the axle shaft 22 is un-coupled from the axle stub 23, the electric wheel motor 17 is disengaged from the internal combustion engine 11. As a result of the disengagement, the axle stubs 23 only receive torque from the electric wheel motors 17.

FIG. 3 shows the operation of selected components of a vehicle drive system in a second operating mode where torque distribution is performed by the internal combustion engine 11 in accordance with one embodiment of the present invention. Under certain conditions it may be desirable to provide torque for rotating the wheels 13, 18 exclusively from the internal combustion engine 11. For example, it may be preferable for the internal combustion engine 11 to exclusively provide torque for rotating wheels 13, 18 when the vehicle is operated at a speed greater than a predetermined speed. The predetermined speed may be set by a manufacturer or a user. Additionally, the predetermined speed may be set according to driving conditions, driving habits, road conditions, or a combination thereof.

As shown in FIG. 3, the internal combustion engine 11 causes rotation of the output shaft 15 via the transmission system 12. The output shaft 15 is connected to the differential 16, which then distributes torque to the axle shafts 22. The axle shafts 22 are respectively coupled to an axle stub 23 via a clutch unit 25 in order to rotate the wheels 13.

Preferably, the control unit 20 controls the clutch unit 25 to couple the axle shafts 22 with the respective axle stub 23 when the vehicle is in the second operating mode, such as when the vehicle is operated at a speed greater than the predetermined speed. When the axle shaft 22 is coupled with the axle stub 23, the electric wheel motor 17 is operatively engaged with the internal combustion engine 11. As a result of the engagement, the axle stubs 23 are capable of receiving torque from the electric wheel motors 17 as well as the internal combustion engine 11. However, as mentioned above, when the vehicle drive system is in the second operating mode, the electric wheel motor 17 preferably does not provide torque to the axle stub 23.

Furthermore, although the electric wheel motor 17 does not provide torque to the axle stub 23 in the second operating mode, the control unit 20 may control each electric wheel motor to reduce or stop the rotation of each respective wheel 13, 18. Thus, the control unit 20 may control each electric wheel motor 17 to act as a traditional brake to replace, complement, or assist the use of a traditional braking mechanism while the vehicle drive system operates in the second operating mode. Also, while in the second operating mode, the internal combustion engine 11 may act as a generator to produce electricity to be stored in the power storage unit 28 and provided to the electric wheel motor 17.

FIG. 4 shows the operation of selected components of a vehicle drive system in a third operating mode where torque distribution is performed by the internal combustion engine 11 and the electric wheel motors 17 in accordance with one embodiment of the present invention. Under certain conditions it may be desirable to provide torque for rotating the wheels 13, 18 from both the internal combustion engine 11 and the electric wheel motors 17. For example, it may be preferable for the vehicle to engage the third operating mode when the vehicle is operated at a speed greater than a predetermined speed. The predetermined speed may be set by a manufacturer or a user. Additionally, the predetermined speed may be set according to driving conditions, driving habits, road conditions, or a combination thereof.

FIG. 4 shows a combination of the vehicle systems shown in FIGS. 2 and 3. The control unit 20 controls the electric wheel motors 17 to couple the axle shaft 22 with the axle stub 23 via the clutch unit 25 when the vehicle is in the third operating mode. Additionally, the control unit 20 controls the electric wheel motors 17 to provide torque to the wheels 13, 18 via the axle stub 23. Furthermore, the internal combustion engine 11 may simultaneously provide torque to the axle shaft 22 via the output shaft 15 which are both coupled to the differential 16.

Similar to the second operating mode, the control unit 20 may vary the amount of torque applied to each wheel 13, 18 via the electric wheel motor 17. Preferably, the control unit 20 varies the amount of torque applied to each wheel 13, 18 according to at least one of a user selection, a driving condition, a road condition, and a user's driving habits. While in the third operating mode, the internal combustion engine 11 may act as a generator to produce electricity to be stored in the power storage unit 28 and provided to the electric wheel motor 17.

In addition to varying the amount of torque applied to each wheel 13, 18, the control unit 20 may control each electric wheel motor to reduce or stop the rotation of each respective wheel 13, 18. Thus, the control unit 20 may control each electric wheel motor 17 to act as a traditional brake such that the vehicle drive system may bypass, assist, or eliminate the use of a traditional braking mechanism. Additionally, in an alternate embodiment of the present invention, the electric wheel motors may house a planetary transmission which may be controlled by the control unit 20 in the third operating mode.

Figure 5:
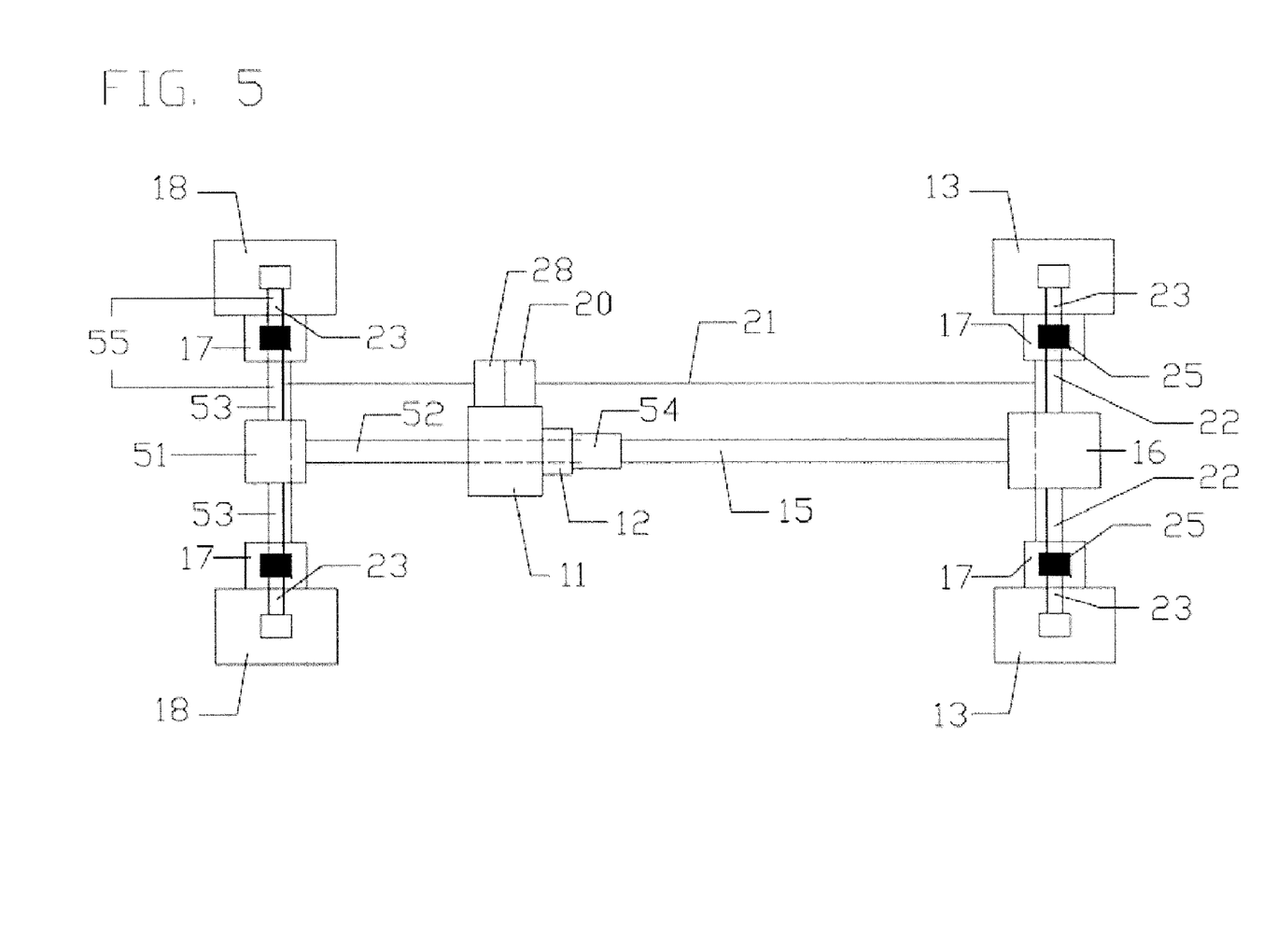
FIG. 5 illustrates the vehicle drive system in accordance with one embodiment of the present invention.

FIG. 5 illustrates an alternate embodiment of the vehicle drive assembly with which the electric wheel motors 17 may be coupled with wheels 13, 18 in accordance with one embodiment of the present invention. As shown in FIG. 5, the vehicle drive assembly includes an internal combustion engine 11 with a conventional transmission system 12. A transfer unit 54 is coupled with the transmission system 12. The internal combustion engine 11 provides driving torque to the wheels 13 via an output shaft 15 coupled to the transfer unit 54 and the differential 16. Additionally, the internal combustion engine 11 provides driving torque to the wheels 18 via a second output shaft 52 which is coupled to the transfer unit 54 and the second differential 51.

The output shaft 15 provides torque to the axle shaft 22 via the differential 16. The axle shaft 22 may be selectively coupled to the axle stub 23 via a clutch unit 25 housed in the electric wheel motor 17. The coupled axle shaft 22 and axle stub 23 comprise the coaxial shaft 14 as shown in FIG. 1.

The second output shaft 52 provides torque to the second axle shaft 53 via the second differential 51. The axle shaft 53 may be selectively coupled to an axle stub 23 via a clutch unit 25 housed in the electric wheel motor 17. The coupled axle shaft 53 and axle stub 23 comprise a coaxial shaft 55.

The differentials 16, 51 may be conventional differentials for providing desired torque distribution to the wheels 13, 18, respectively. The output shaft 15, 52 may provide driving torque to wheels 13, 18, respectively depending on an operative condition of the coupling unit, which selectively couples the axle shafts 22, 53 to respective axle stubs 23.

In accordance with the present invention, the system shown in FIG. 5 may include various operating modes. For example, torque may be provided for rotating the wheels 13, 18 exclusively from the electric wheel motors 17. Alternatively, torque may be provided for rotating the wheels 13, 18 exclusively from the internal combustion engine 11. Furthermore, torque for rotating the wheels 13, 18 may be provided from both the internal combustion engine 11 and the electric wheel motors 17. The various operating modes discussed above are similar to the operating modes discussed with respect to FIGS. 2-4. Therefore, discussion of these operating modes will be omitted with respect to FIG. 5.

As described above, the present invention provides various effects or advantages. For example, vehicle performance may be controlled electronically via an electric wheel motor. Thus, because electric wheel motor parts are smaller and cheaper to manufacture, costs are reduced. Costs are also reduced since the combustion engine, drivetrain, and electric wheel motors may be used in various configurations to meet the specific needs of a customer. Moreover, use of electric wheel motors improve vehicle efficiency. Specifically, the electric wheel motors reduce fuel costs and allow for improved performance of the internal combustion engine since the internal combustion engine may be tailored to perform in a narrow speed range.

Although the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A vehicle drive assembly, comprising:
    an engine;
    a transmission operably coupled with the engine;
    a transfer unit operably associated with the transmission;
    a front output shaft operably coupled with the transfer unit;
    a front differential operably coupled with the front output shaft;
    a front axle shaft rotatably coupled to the front differential;
    a front wheel selectively coupled to the front axle shaft via a front rotatable axle stub;
    an electric wheel motor, disposed between the front axle shaft and the front rotatable axle stub, operably coupled to the front wheel via the front rotatable axle stub; and
    a coupling device operably coupled with the electric wheel motor for selectively coupling the front axle stub with the front axle shaft,
    wherein the front wheel cannot be rotated by the engine via the front axle shaft when the front axle shaft is not coupled to the front axle stub, and
    wherein the front wheel is rotated via torque provided via the electric wheel motor when the front axle shaft is not coupled to the front axle stub.

2. The vehicle drive assembly of claim 1, further comprising:
    a rear output shaft operably coupled with the transfer unit, wherein the rear output shaft rotates according to an operation between the engine, the transmission, and the transfer unit;
    a rear differential operably coupled with the rear output shaft;
    a rear axle shaft rotatably coupled to the rear differential; and
    a rear wheel coupled to the rear axle shaft.

3. The vehicle drive assembly of claim 1,
    wherein the front output shaft rotates according to an operation between the engine, the transmission, and the transfer unit,
    wherein the front axle shaft is rotated by the front differential when the front output shaft rotates, and
    wherein the front wheel is rotated according to a rotation of the front axle shaft when the front axle shaft is operably coupled to the front axle stub.

4. The vehicle drive assembly of claim 1, further comprising a controller for controlling the vehicle drive assembly according to at least
    a first mode wherein the coupling device uncouples the front axle shaft from the front axle stub and the electric wheel motor alone provides torque to the front axle stub to rotate the front wheel,
    a second mode wherein the coupling device couples the front axle shaft with the front axle stub and the engine alone provides torque to the front axle stub via the front axle shaft to rotate the front wheel, or
    a third mode wherein the coupling device couples the front axle shaft with the front axle stub and both the electric wheel motor and engine provide torque to the front axle stub to rotate the front wheel.

5. The vehicle drive assembly of claim 4, wherein the controller controls the amount of torque output from the electric wheel motor.

6. A vehicle drive assembly, comprising:
an engine;
a transmission operably coupled with the engine;
a transfer unit operably associated with the transmission;
a rear output shaft operably coupled with the transfer unit;
a rear differential operably coupled with the rear output shaft;
a rear axle shaft rotatably coupled to the rear differential;
a rear wheel selectively coupled to the rear axle shaft via a rear rotatable axle stub;
an electric wheel motor, disposed between the rear axle shaft and the rear rotatable axle stub, operably coupled to the rear wheel via the rear rotatable axle stub; and
a coupling device operably coupled with the electric wheel motor for selectively coupling the rear axle stub with the rear axle shaft,
wherein the rear wheel cannot be rotated by the engine via the rear axle shaft when the rear axle shaft is not coupled to the rear axle stub, and
wherein the rear wheel is rotated via torque provided via the electric wheel motor when the rear axle shaft is not coupled to the rear axle stub.

7. The vehicle drive assembly of claim 6, further comprising:
a front output shaft operably coupled with the transfer unit, wherein the front output shaft rotates according to an operation between the engine, the transmission, and the transfer unit;
a front differential operably coupled with the front output shaft;
a front axle shaft rotatably coupled to the front differential; and
a front wheel coupled to the front axle shaft.

8. The vehicle drive assembly of claim 6,
wherein the rear output shaft rotates according to an operation between the engine, the transmission, and the transfer unit,
wherein the rear axle shaft is rotated by the rear differential when the rear output shaft rotates, and
wherein the rear wheel is rotated according to a rotation of the rear axle shaft when the rear axle shaft is operably coupled to the rear axle stub.

9. The vehicle drive assembly of claim 6, further comprising a controller for controlling the vehicle drive assembly according to at least
a first mode wherein the coupling device uncouples the rear axle shaft from the rear axle stub and the electric wheel motor alone provides torque to the rear axle stub to rotate the rear wheel,
a second mode wherein the coupling device couples the rear axle shaft with the rear axle stub and the engine alone provides torque to the rear axle stub via the rear axle shaft to rotate the rear wheel, or
a third mode wherein the coupling device couples the rear axle shaft with the rear axle stub and both the electric wheel motor and engine provide torque to the rear axle stub to rotate the rear wheel.

10. The vehicle drive assembly of claim 9, wherein the controller controls the vehicle drive assembly according to the first mode when a vehicle speed is less than a predetermined speed and according to the second mode and third mode when a vehicle speed is greater than a predetermined speed.

11. The vehicle drive assembly of claim 9, wherein the controller controls the amount of torque output from the electric wheel motor.

12. The vehicle drive assembly of claim 9, wherein the amount of torque output from the electric wheel motor varies according to at least one of a driver selection, a road condition, and a driving condition.

13. The vehicle drive assembly of claim 9, wherein the controller controls the operation of the engine in a fourth mode such that the engine functions as a generator for a power storage medium providing power to the electric wheel motor.

14. The vehicle drive assembly of claim 9, wherein the electric wheel motor supplies a force to the rear axle stub to reduce the rotation of the rear wheel in the first mode, second mode, or third mode.

15. A vehicle drive assembly, comprising:
an engine;
a transmission operably coupled with the engine;
a transfer unit operably associated with the transmission;
a rear output shaft operably coupled with the transfer unit;
a rear differential operably coupled with the rear output shaft;
a rear axle shaft rotatably coupled to the rear differential;
a front output shaft operably coupled with the transfer unit;
a front differential operably coupled with the rear output shaft;
a front axle shaft rotatably coupled to the rear differential;
a rear wheel selectively coupled to the rear axle shaft via a rear rotatable axle stub;
a front wheel selectively coupled to the front axle shaft via a front rotatable axle stub;
a rear electric wheel motor, disposed between the rear axle shaft and the rear rotatable axle stub, operably coupled to the rear wheel via the rear rotatable axle stub;
a rear coupling device operably coupled with the electric wheel motor for selectively coupling the rear axle stub with the rear axle shaft;
a front electric wheel motor, disposed between the front axle shaft and the front rotatable axle stub, operably coupled to the front wheel via the front rotatable axle stub; and
a front coupling device operably coupled with the electric wheel motor for selectively coupling the front axle stub with the front axle shaft.

16. The vehicle drive assembly of claim 15,
wherein the rear wheel cannot be rotated by the engine via the rear axle shaft when the rear axle shaft is not coupled to the rear axle stub, and
wherein the rear wheel is rotated via torque provided via the rear electric wheel motor when the rear axle shaft is not coupled to the rear axle stub.

17. The vehicle drive assembly of claim 15,
wherein the front wheel cannot be rotated by the engine via the front axle shaft when the front axle shaft is not coupled to the front axle stub, and
wherein the front wheel is rotated via torque provided via the front electric wheel motor when the front axle shaft is not coupled to the front axle stub.

18. The vehicle drive assembly of claim 15, further comprising a controller for controlling the vehicle drive assembly according to at least one of:

a first mode wherein the coupling device uncouples the rear axle shaft from the rear axle stub and the rear electric wheel motor alone provides torque to the rear axle stub to rotate the rear wheel;

a second mode wherein the coupling device couples the rear axle shaft with the rear axle stub and the engine alone provides torque to the rear axle stub via the rear axle shaft to rotate the rear wheel; and a third mode wherein the coupling device couples the rear axle shaft with the rear axle stub and both the rear electric wheel motor and engine provide torque to the rear axle stub to rotate the rear wheel.

19. The vehicle drive assembly of claim 15, further comprising a controller for controlling the vehicle drive assembly according to at least one of:

a first mode wherein the coupling device uncouples the front axle shaft from the front axle stub and the front electric wheel motor alone provides torque to the front axle stub to rotate the front wheel;

a second mode wherein the coupling device couples the front axle shaft with the front axle stub and the engine alone provides torque to the front axle stub via the front axle shaft to rotate the front wheel; and a third mode wherein the coupling device couples the front axle shaft with the front axle stub and both the front electric wheel motor and engine provide torque to the front axle stub to rotate the front wheel.

20. A vehicle drive assembly, comprising:

an engine;

a transmission operably coupled with the engine;

a transfer unit operably associated with the transmission;

an output shaft operably coupled with the transfer unit;

a differential operably coupled with the output shaft;

a first axle shaft rotatably coupled to the front differential;

a second axle shaft;

a first wheel coupled to the first axle shaft;

a second wheel selectively coupled to the second axle shaft via a rotatable axle stub;

an electric wheel motor, disposed between the second axle shaft and the rotatable axle stub, operably coupled to the second wheel via the rotatable axle stub;

a coupling device operably coupled with the electric wheel motor for selectively coupling the axle stub with the second axle shaft, wherein the second wheel is rotated via torque provided via the electric wheel motor when the second axle shaft is not coupled to the axle stub.

* * * * *